(12) United States Patent
Hunter (10) Patent No.: US 7,320,279 B2
(45) Date of Patent: Jan. 22, 2008

(54) CUTTER ASSEMBLY FOR EXTRUDING SHAPED FOOD PIECES

(75) Inventor: Thomas B. Hunter, Collinsville, IL (US)

(73) Assignee: Kerry, Inc., Beloit, WI (US)

( * ) Notice: Subject to any disclaimer, the term of this patent is extended or adjusted under 35 U.S.C. 154(b) by 547 days.

(21) Appl. No.: 10/745,660

(22) Filed: Dec. 29, 2003

(65) Prior Publication Data

US 2004/0216619 A1 Nov. 4, 2004

Related U.S. Application Data

(60) Provisional application No. 60/436,650, filed on Dec. 30, 2002.

(51) Int. Cl.
*A21C 11/10* (2006.01)

(52) U.S. Cl. .................. 99/450.6; 99/353; 425/311; 425/133.1

(58) Field of Classification Search .......... 99/352–355, 99/372, 426, 450.1, 450.2, 450.6, 450.7; 425/131.1, 133.1, 311, 313, 461, 464, 142; 426/513, 518

See application file for complete search history.

(56) References Cited

U.S. PATENT DOCUMENTS

| | | | |
|---|---|---|---|
| 2,101,755 A * | 12/1937 | Rosenstone et al. | ......... 425/308 |
| 2,676,552 A * | 4/1954 | Hunter et al. | ............... 426/499 |
| 3,143,085 A * | 8/1964 | Gebhardt et al. | ........... 425/288 |
| 3,362,355 A | 1/1968 | Roth | |
| 3,452,687 A | 7/1969 | Kaneko et al. | |
| 3,860,373 A | 1/1975 | Kaufman et al. | |
| 4,015,518 A | 4/1977 | Roth et al. | |
| 4,080,137 A * | 3/1978 | McCarthy | .................... 425/311 |
| 4,152,102 A * | 5/1979 | Sasiela et al. | ............... 425/288 |
| 5,004,399 A | 4/1991 | Sullivan et al. | |
| 5,435,714 A * | 7/1995 | Van Lengerich et al. | ... 425/313 |
| 5,637,329 A * | 6/1997 | Abrams et al. | ............. 425/142 |
| 5,773,043 A | 6/1998 | Hunter | |
| 6,511,309 B1 | 1/2003 | Hunter | |

* cited by examiner

*Primary Examiner*—Timothy F. Simone
(74) *Attorney, Agent, or Firm*—Birch, Stewart, Kolasch & Birch, LLP (57) ABSTRACT

A cutter assembly for an extruder includes an elongated extrusion member having an opened feed end. The opened feed end is attachable in fluid communication with a first manifold of the extruder. A filling tube extends through the elongated extrusion member, which is attachable to a second manifold of the extruder. An extrusion die is formed in the elongated extrusion member. The extrusion die is shaped to the general shape of a natural food piece. A cutter member has an opened drivable end, an elongated cutter wall, and an opened cutter end with a cutting surface for cutting extrudate to a desired length as the extrudate exits the die. The cutting surface is shaped to the general shape of the extrusion die. The cutter member is disposed at least partially over and reciprocally slidable on the extrusion wall and operably connectable at the drivable end to a drive device of the extruder for reciprocatably sliding the cutting surface of the cutter member over and away from the extrusion die.

15 Claims, 7 Drawing Sheets

CUTTER ASSEMBLY FOR EXTRUDING SHAPED FOOD PIECES

This Nonprovisional application claims priority under 35 U.S.C. §119(e) on U.S. Provisional Application No(s). 60/436,650 filed on Dec. 30, 2002, the entire contents of which are hereby incorporated by reference.

BACKGROUND OF THE INVENTION

1. Field of the Invention

The present invention relates to an extruder cutter assembly for extruding filled food pieces. More particularly, the present invention relates to an extruder cutter assembly, which includes an extrusion member having a filling tube therein and a cutter member for cutting extrudate exiting the extrusion member to form a filled food piece having the shape of a natural food piece.

2. Description of Background Art

Extruders for producing extruded food pieces are known. Such extruders can conventionally include a pressure vessel for containing, under pressure, a mash of the food to be extruded. Furthermore, pressure exerting means for maintaining pressure in the pressure vessel, a manifold in fluid communication with the pressure vessel, and an extruder cutter assembly, generally located underneath the pressure vessel, in fluid communication with the manifold can be included. The extruded food is cut to size by the extruder cutter assembly.

Food products that can be extruded in such extruders include, e.g., meats, poultry, seafood, cereal grains, vegetables, fruits, and solid dairy products. As specific examples, the mash may be prepared from beef, chicken, shrimp, wheat, corn, rice, potatoes, apples, and cheese.

The food is ground to a particle size consistent with forming a fluid mash, e.g., particle sizes that will pass through a U. S. Screen Series No. 5 screen, more usually a No. 10 screen, and often a No. 20 screen up to about a No. 100 screen.

Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

The present inventor has invented an extruder cutter assembly for extruding a food piece in the shape of a natural food piece. In U.S. Pat. No. 5,773,043, an extruder cutter assembly includes an extrusion member and a tubular cutter member for cutting extrudate exiting the extrusion member. However, the '043 Patent does not include a filling tube for extruding a filling along with a mash of food to be cut with the cutter member. U.S. Pat. No. 5,773,043 is hereby incorporated by reference.

The present inventor has also invented an extruder cutter assembly for extruding foodstuff containing a filling. In U.S. application Ser. No. 09/576,766 filed on May 24, 2000, an extruder cutter assembly includes an extension formed on the extrusion member and a filling tube to allow for the extrudate to exit the extruder cutter assembly from the side. This extruder is directed to the formation of a foodstuff in stick form, not in the shape of a natural food piece as in the present invention. Accordingly, it is necessary to include the extension on both cutter member and the extrusion member, which is not included in the cutter assembly of the present invention. U.S. application Ser. No. 09/576,766 is hereby incorporated by reference.

SUMMARY OF THE INVENTION

It is an object of the present invention to provide an extruder cutter assembly, which makes up for the above deficiencies of the background art. Specifically, it is an object of the present invention to provide an extruder cutter assembly, which can form an extruded product having a filling in the shape of a natural food piece.

In order to accomplish the above objects of the present invention, an extruder cutter assembly according to the present invention comprises:

an elongated extrusion member having an opened feed end, said opened feed end being attachable in fluid communication with a first manifold of the extruder for supplying a mash to said elongated extrusion member;

a filling tube extending through said elongated extrusion member, said filling tube being attachable to a second manifold of the extruder for supplying a filling to said filling tube;

an extrusion die formed in said elongated extrusion member, said extrusion die being shaped to the general shape of a natural food piece; and a cutter member having an opened drivable end, an elongated cutter wall, and an opened cutter end with a cutting surface for cutting extrudate to a desired length as the extrudate exits the die, said cutting surface being shaped to the general shape of said extrusion die, and said cutter member being disposed at least partially over and reciprocally slidable on the extrusion wall and operably connectable at the drivable end to a drive device of the extruder for reciprocatably sliding the cutting surface of the cutter member over and away from the extrusion die.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will now be described with reference to the accompanying drawings in which the same reference numerals have been used to identify the same or similar elements.

Figure 1:
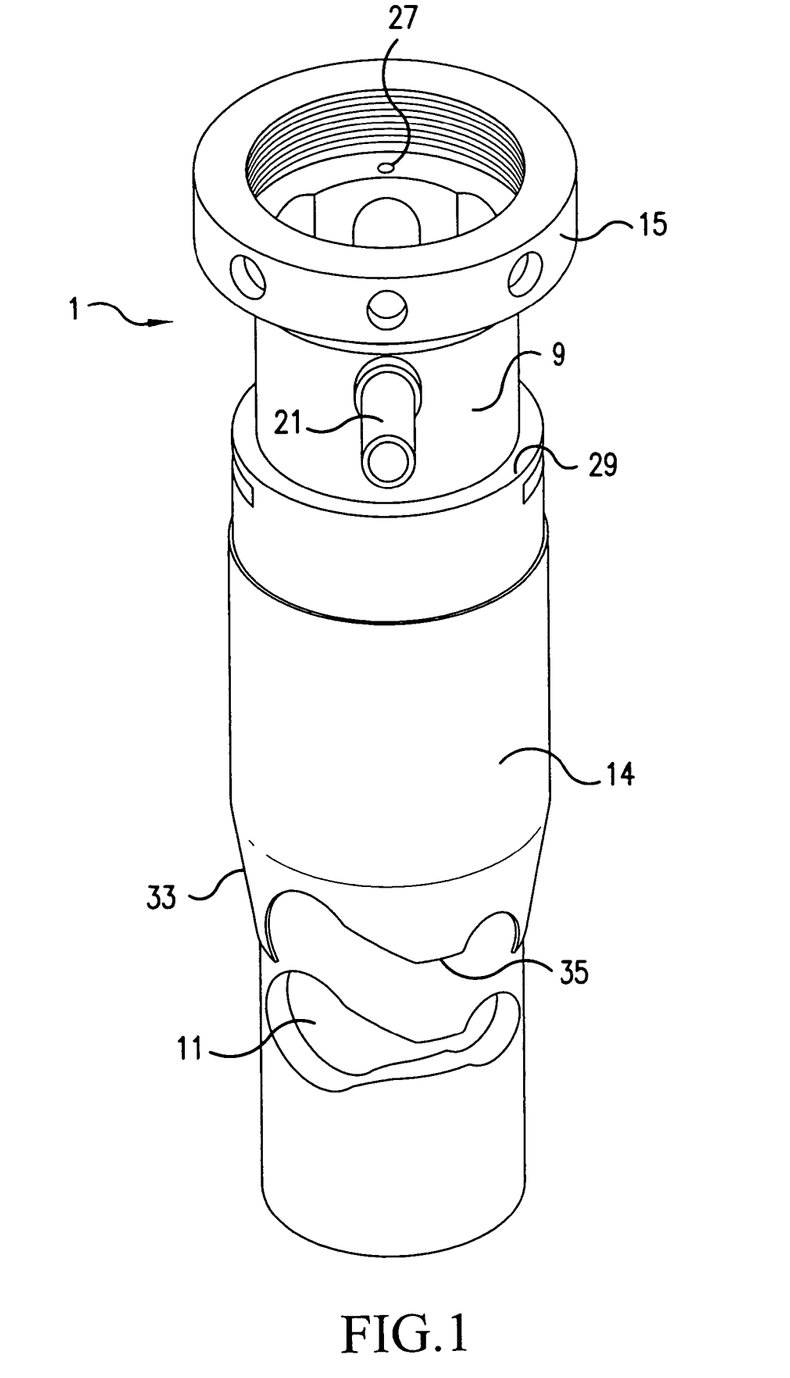
FIG. 1 is a perspective view of the extruder cutter assembly of the present invention.
Figure 2:
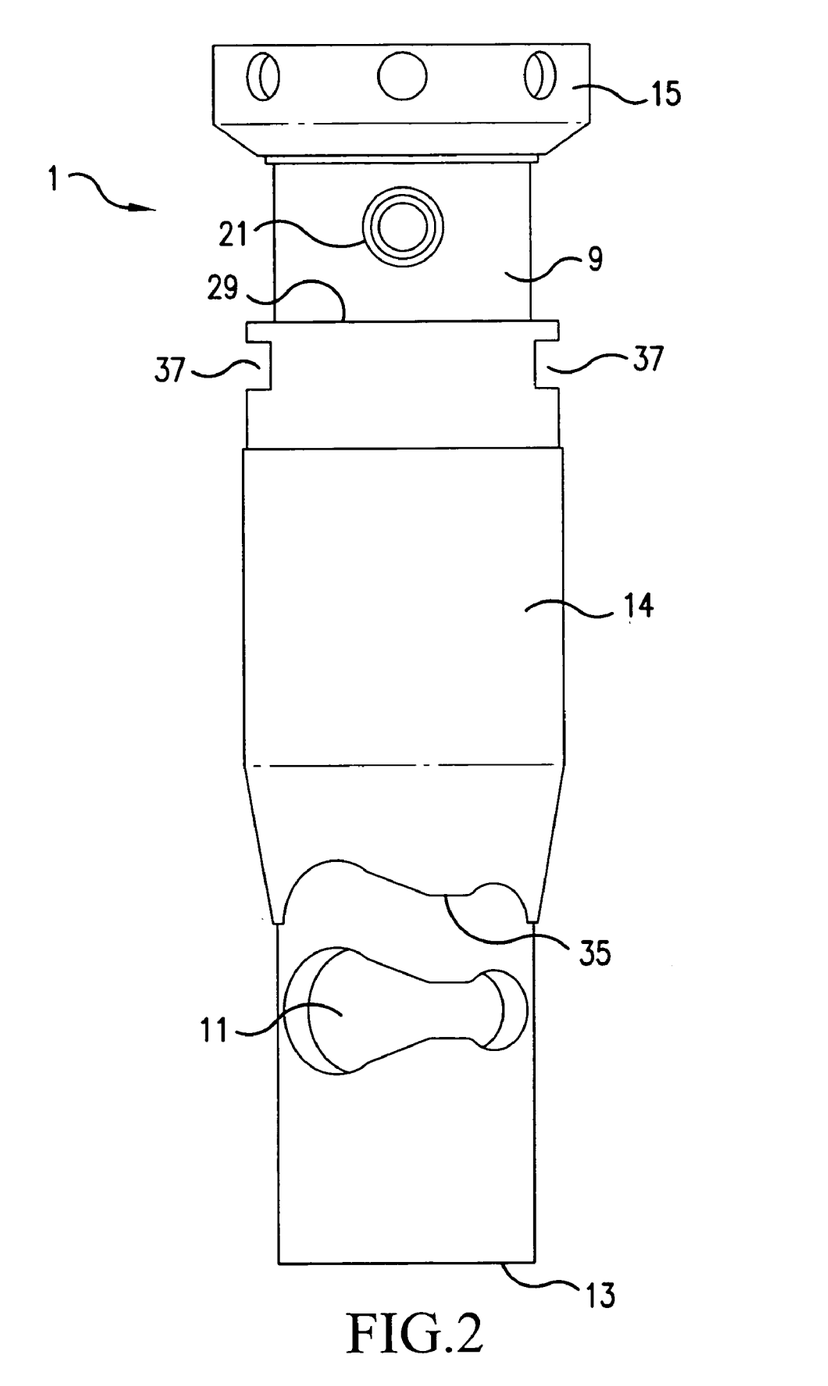
FIG. 2 is a front elevation of the extruder cutter assembly of the present invention illustrating the "ready to cut" state.

FIGS. 1 and 2 illustrate the extruder cutter assembly 1 of the present invention in the "ready to cut" state. Referring to FIGS. 1-2, the extruder cutter assembly 1 includes an elongated annular extrusion member 9 and a tubular cutter member 14. The annular extrusion member 9 has a generally tubular extrusion wall 10 (see FIG. 4) on which the tubular cutter member 14 is mounted for reciprocation to cut extrudate exiting the die 11 formed in the tubular extrusion wall 10. The die 11 is formed by a through hole of a predetermined shape of a natural food piece. In the figures, the natural food piece is a chicken drummy; however, it should be understood to one having ordinary skill in the art that the die can be formed in other shapes as well.

Figure 4:
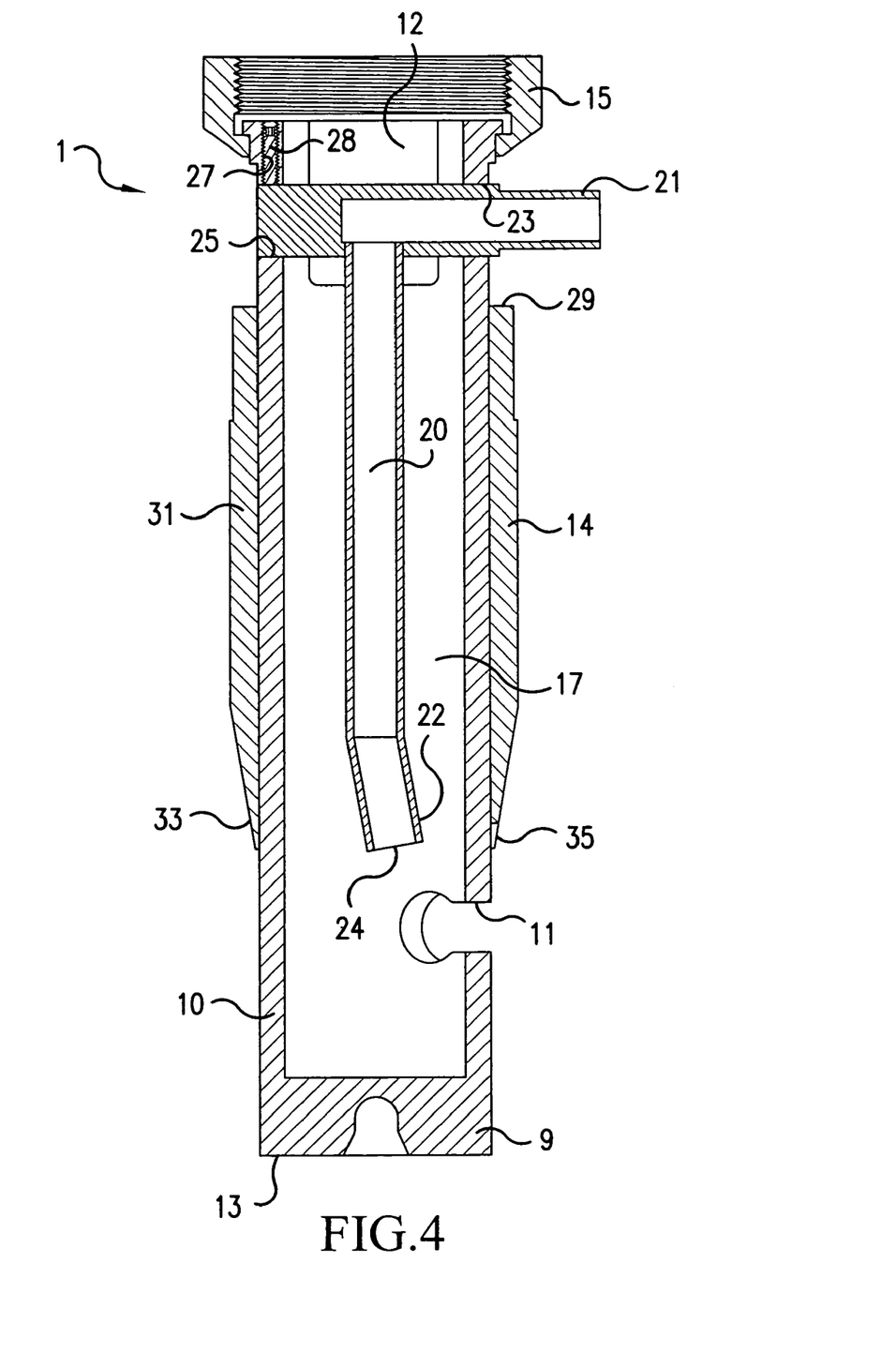
FIG. 4 is a cross-section of the extruder cutter assembly of the present invention along line 4-4 of FIG. 3.

Referring to FIG. 4, it is advantageous to apply a nidox coating to the die 11. the nidox coating is applied to at least a bottom of the elongated extrusion member 9 prior to the formation of the through hole, which forms the die 11. The die is then cut out to the general shape of a desired food piece. This process results in a very sharp edge on the die 11. It has been found by the present inventor that the sharp edge remains sharp for an extended period of time when the nidox coating is applied prior to cutting the die, rather than after. This is due to the fact that the application of a nidox coating after the die is cut actually dulls the cutting edge.

The extrusion member 9 has a closed end 13 and an opened feed end 12 (see FIG. 4). The extruder cutter assembly 1 of the present invention is attachable to an extruder, such as the extruder described in the above-mentioned U.S. Pat. No. 5,773,043. Accordingly, the extruder will not be described in detail. The open feed end 12 is attachable in fluid communication to a manifold (not shown) by, for example, a threaded flange 15. The manifold is connectable to a pressure vessel (not shown) for containing a mash under pressure by a pressure-asserting device (not shown).

Further to this, it is preferable that the extruder cutter assembly 1 of the present invention be a 1¾" or a 2" diameter assembly. A 2" diameter assembly would be the maximum diameter supportable by, for example, the above-mentioned extruder. However, it should be understood to one having ordinary skill in the art that an assembly of a larger or smaller diameter is within the scope of the present invention. The use of larger diameter assemblies can be accomplished by modifying the extruder itself to provide a larger distance between assemblies. Alternatively, a larger diameter assembly can be accomplished by providing an assembly on every other attachment, with alternating attachments being closed off.

A filling tube 20 extends through an internal passageway 17 of the annular extrusion member 9. The filling tube 20 includes a filling tube extension 21, which extends through the extrusion wall 10 of the annular extrusion member 9. The extrusion wall 10 includes a pair of holes 23 and 25 for receiving the filling tube extension 21. A hole 27 includes a setscrew 28, for example, therein to secure the filling tube extension 21 in place. An o-ring can be used to seal between the filling tube extension 21 and the holes 23 and 25 to ensure that filling material does not seep into the internal passageway 17 of the annular extrusion member 9. The filling tube 20 is also in fluid communication with a second manifold (not shown), which is connectable to a second pressure vessel (not shown) for containing a filling under pressure by a second pressure exerting device (not shown) via the filling tube extension 21.

It is noted that the manifolds are included in the embodiment described above for distributing the mash and the filling to a plurality of extruder cutter assemblies. However, if only one extruder cutter assembly is to be used, the necessity of the manifolds is eliminated.

It should also be understood that the extruder cutter assembly 1 of the present invention can also be operated in a reverse manner. Specifically, providing a mash to the filling tube 20 and a sauce or filling to the internal passageway 17 can form a very unique food product having a coating on the outside. Of course, in this example, the relative sizes of the filling tube 20 and the internal passageway 17 may have to be modified in order to obtain a desired product.

The tubular cutter member 14 has an open drivable end 29, an elongated cutter wall 31, and an open cutter end 33. The open cutter end 33 includes a cutting surface 35 for cooperating with the die 11 in the extrusion wall 10 to cut and crimp extrudate to a desired length as the extrudate exits the extrusion member 9. The cutting surface 35 should be formed at an angle between 25 to 90° to a surface of the extrusion wall 10.

Figure 5:
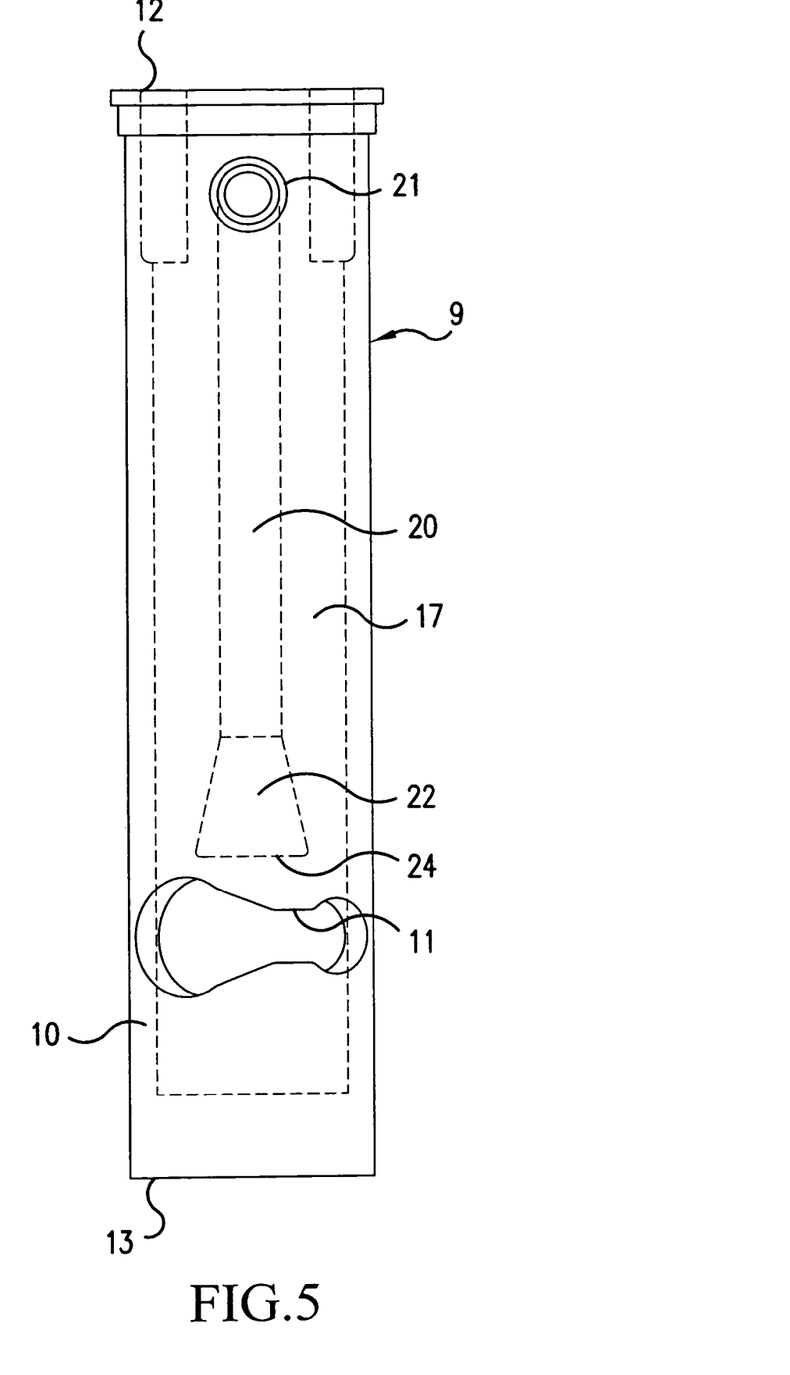
FIG. 5 is a front elevation of the annular extrusion member of the present invention.
Figure 6:
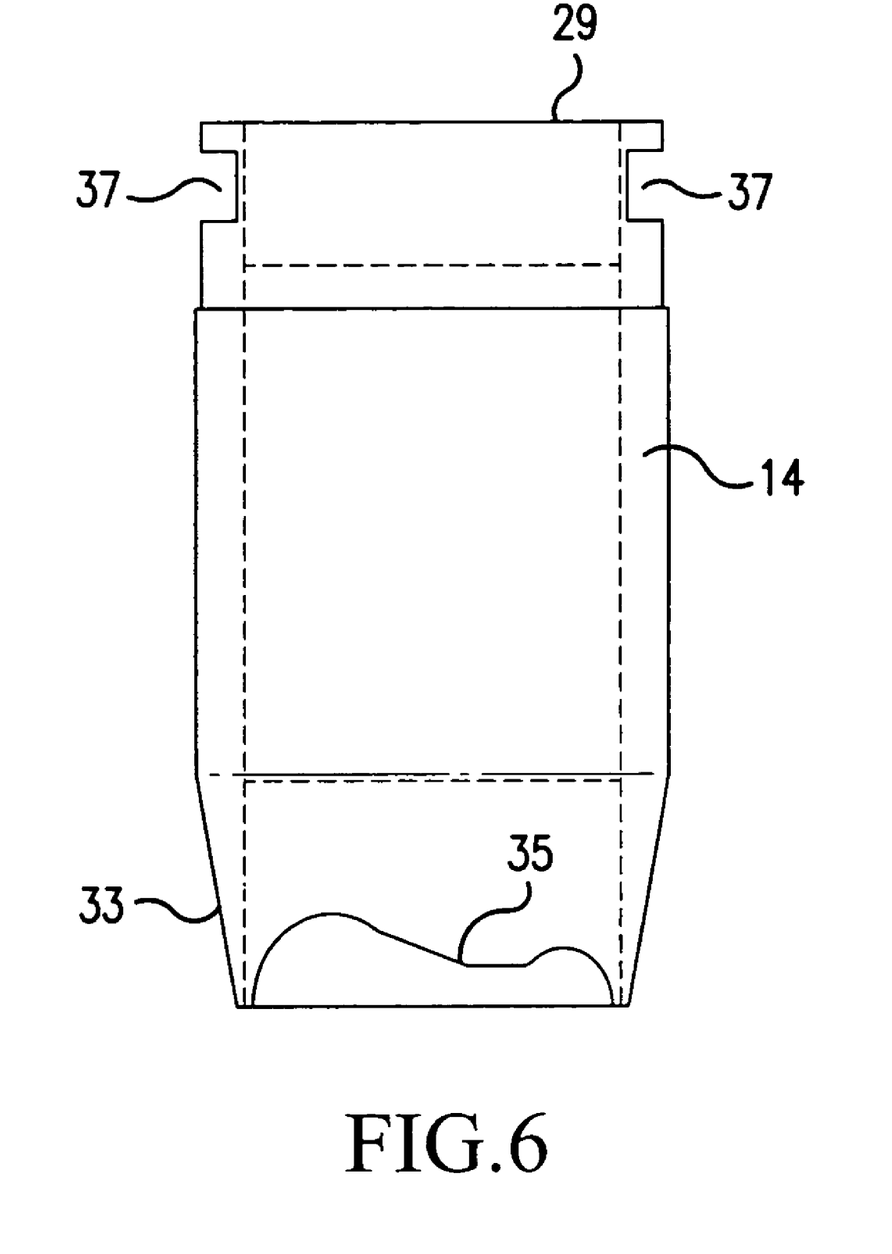
FIG. 6 is a front elevation of the tubular cutter member of the present invention.
Figure 7:
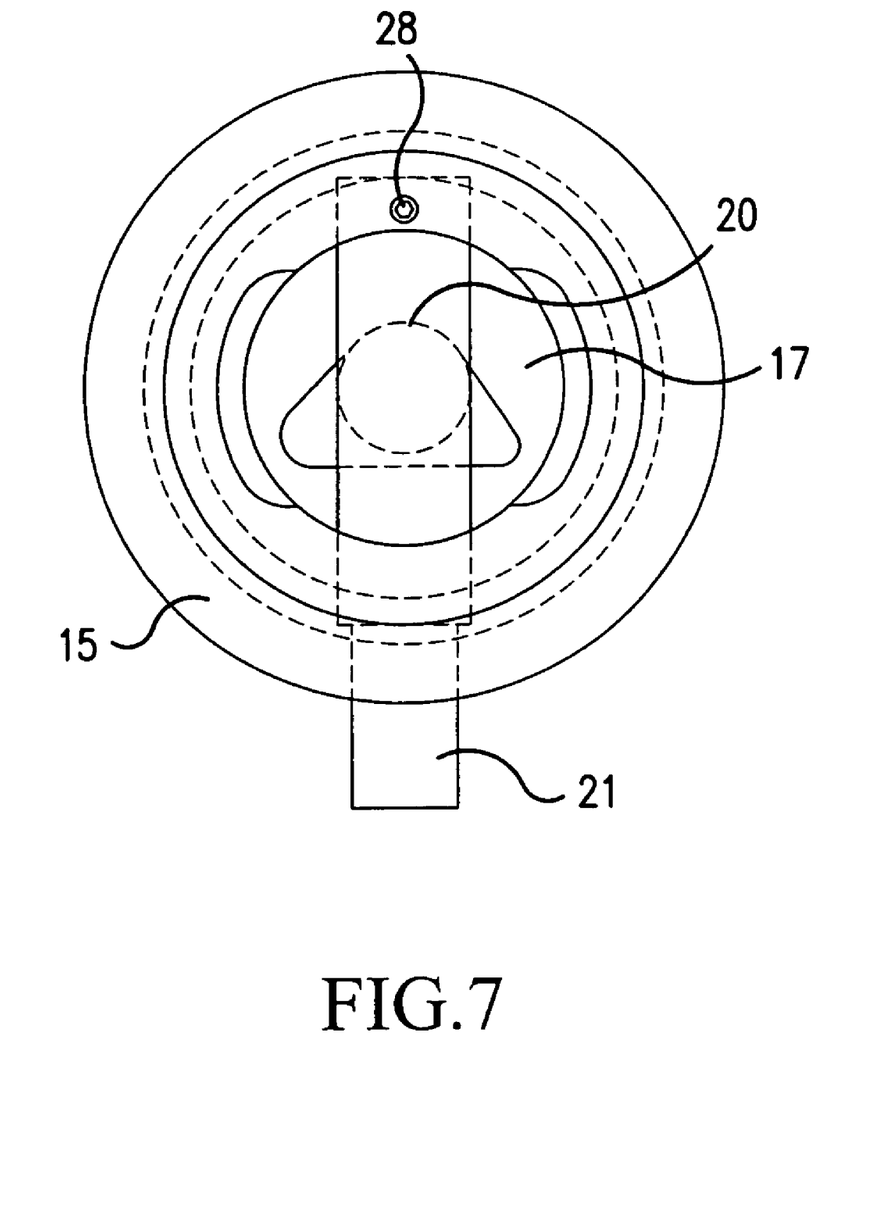
FIG. 7 is a top view of FIG. 4 of the present invention.

Referring to FIG. 2, the cutting surface 35 is shaped to the general configuration of the die 11 as disclosed in the above-mentioned U.S. Pat. No. 5,773,043 in order to obtain a more natural looking food piece. In addition, referring to FIG. 4, it is preferred that an end 22 of the filling tube 20 be bent toward the die 11. This ensures that the filling exits the die 11 in a smooth and consistent manner through a center of the die 11. It is preferable that the filling tube be bent at an angle of 10°; however, the specific bend to the filling tube 20 will depend on a particular application. Furthermore, an opening 24 of the filling tube 20 can advantageously be shaped to the general shape of the die 11. For example, referring to FIG. 5, the opening 24 of the filling tube 20 is lengthened in the length direction of the die 11.

In addition, although not illustrated in the figures, the opening 24 can also be increased in the width direction as well, depending on the application. For example, in FIG. 5, the die 11 is in the shape of a chicken drummy. Therefore, the left side of the opening 24 should be wider than the right side in order to ensure that more filling is supplied to the wider portion of the resulting chicken drummy. It should also be understood to one having ordinary skill in the art that the shape of the opening 24 will depend on the shape of the die 11. Specifically, shaping the opening 24 to the general shape of the die 11 will result in a more evenly filled food piece.

Referring again to FIG. 2, the elongated cutter wall 31 of the tubular cutter member 14 includes two cut-out portions 37 formed on an outside surface thereof adjacent the open drivable end 29. The cut-out portions 37 are for receiving the operable end of a drive device (not shown) in order to reciprocate the cutter member 14 in cooperation with the die 11. The drive device can be any well known device for reciprocating the cutter member 14. It is also possible to provide a groove (not shown) around the outer circumference of the annular extrusion member 9 instead of the cut-out portions 37 as would be understood to one having ordinary skill in the art. However, if a groove is used, it will be necessary to also include a mechanism for ensuring that the cutting surface 35 remains aligned with the die 11.

It is noted that the extrusion wall 10 and the cutter member 14 are illustrated having cooperating circular tubular shapes; however, it can be readily understood to one having ordinary skill in the art that they may be made in other cooperating shapes as well. All that is necessary is for the cutter member 14 to have an inside diameter of generally the same size and shape as the outside diameter and shape of the extrusion wall 10 to allow the cutting member 14 to reciprocate in a sliding manner on the outside of the extrusion wall 10.

Figure 3:
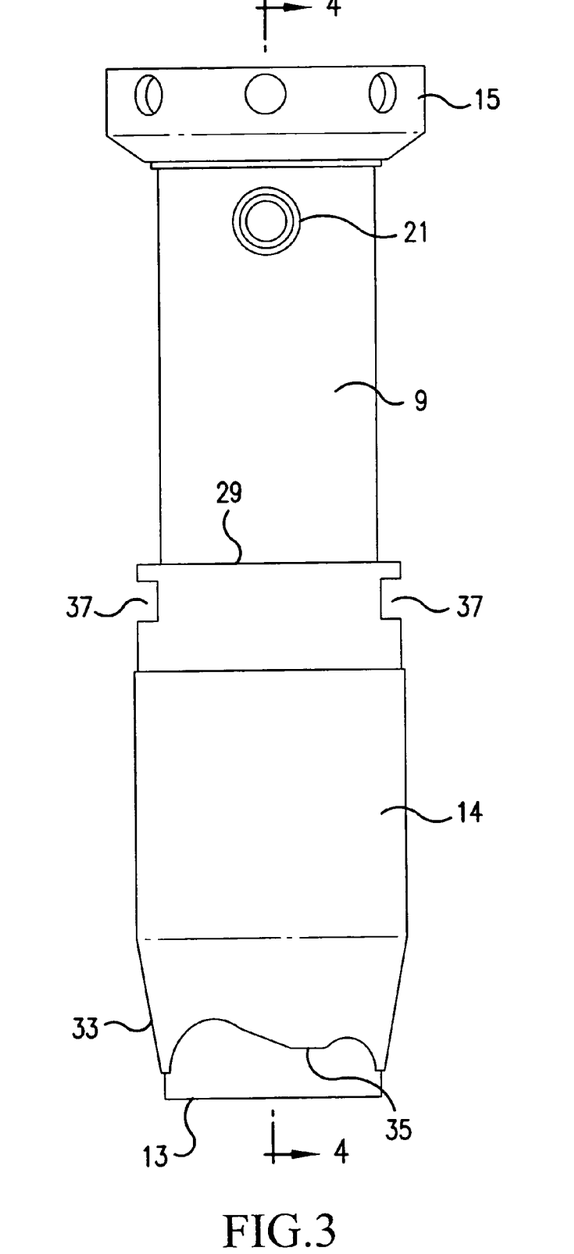
FIG. 3 is a front elevation of the extruder cutter assembly of the present invention illustrating the "after cut" state.

The operation of the extruder cutter assembly of the present invention will now be described with reference to FIGS. 2 and 3. FIG. 2 illustrates the "ready to cut" state, while FIG. 3 illustrates the "after cut" state. It should be noted that the "after cut" state can actually be beyond the closed end 13 of the extrusion member 9. Referring to FIG. 2, the mash is forced through the open feed end 12 of the extrusion member 9 from the pressure vessel for containing a mash of food while the cutter member 14 is in the upper position. The filling is also forced through the filling tube extension 21 and the filling tube 20 from the pressure vessel for containing filling. As noted above, if a plurality of extruder cutter assemblies is used, the mash and filling are also fed through first and second manifolds, respectively, for distributing the mash and filling to the extruder cutter assemblies.

The mash and filling merge together in the internal passageway 17 and are forced through the die 11. Once a predetermined length of extrudate is fed through the die 11, the cutter member 14 is moved from the position illustrated in FIG. 2 to the position illustrated in FIG. 3 to cut the extrudate to the predetermined length. The movement of the cutter member 14 drives the cutting surface 35 into cooperation with the die 11 in order to cut the extrudate and crimp the extrudate to ensure that the filling remains within the extruded food product after being cut.

The above operation occurs continuously with the extrudate exiting the die 11 and being cut by the reciprocating cutter member 14 in order to produce food products of a predetermined length.

It should be noted that the filling tube 20 can be removed from the filling tube extension 21. This allows for the filling tube 20 to be replaced with a filling tube 20 having a passageway of a different shape. This allows the possibility of matching the shape of the opening 24 in the filling tube 20 with the die 11 in the extrusion member 9. This provides the advantage of increasing the consistency in the filing of the resulting extruded food product. The possibility of removing the filling tube 20 from the filling tube extension 21 and the filling tube 21 from the extrusion member 9 also allows for easy cleaning of the extruder cutter assembly 1.

The cutter member 14 is disposed at least partially over and reciprocally slidable on the tubular extrusion wall 10 and is operably connected at the drivable end to a drive device for reciprocatably sliding the cutter member over and away from the die 11. The rate of number of strokes per minute (down and up) at which the cutter member can operate can range from 40 strokes/minute through 700 strokes/minute.

The pressure in the pressure vessel will vary considerably from mash to mash and die to die, but pressures of 1 to 250 psig are normally used, especially with the usual mash temperatures of 25° F. to 75° F. Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

The length of individual products extruded in accordance with the present invention will depend upon both the rate at which the cutter member operates and the rate at which the product is extruded, the latter being a function of the viscosity of the product in the pressure vessel and the pressure being applied to that product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cutter assembly for an extruder for producing an extruded food piece containing a filling, the extruder including a first pressure vessel for containing a mash of the food under pressure, a second pressure vessel for containing the filling under pressure, a pressure exerting device for maintaining pressure in the pressure vessels, and first and second manifolds in fluid communication with the first and second pressure vessels, respectively, said cutter assembly being attachable in fluid communication with the first and second manifolds, and comprising:

an elongated extrusion member, said elongated extrusion member including a tubular extrusion wall, said elongated extrusion member including an opened feed end formed on an end thereof, said opened feed end being attachable in fluid communication with the first manifold of the extruder;

a filling tube extending through said elongated extrusion member, said filling tube being attachable to the second manifold of the extruder;

an extrusion die formed in said elongated extrusion member, said extrusion die being shaped to the general shape of a natural food piece; and a cutter member having an opened drivable end, an elongated cutter wall, and an opened cutter end with a cutting surface for cutting extrudate to a desired length as the extrudate exits said extrusion die, said cutting surface being shaped to the general shape of said extrusion die, and said cutter member being disposed at least partially over and reciprocally slidable on the extrusion wall and operably connectable at the drivable end to a drive device of the extruder for reciprocatably sliding the cutting surface of the cutter member over and away from the extrusion die.

2. The cutter assembly according to claim 1, wherein said filling tube includes a filling tube extension attached to an end of said filling tube adjacent said opened feed end, said filling tube extension extending transverse to an axis of said filling tube and being connectable to the second manifold of the extruder.

3. The cutter assembly according to claim 1, wherein said cutter member is tubular and said elongated cutter wall includes an inside diameter generally the same diameter as an outside diameter of said extrusion wall, said cutter member being slidable on said extrusion wall to reciprocate said cutting surface in cooperation with said extrusion die.

4. The cutter assembly according to claim 1, wherein said filling tube extends through an axial center of said elongated extrusion member, said filling tube having an end adjacent to said extrusion die, said end being bent toward said extrusion die.

5. The cutter assembly according to claim 1, wherein said filling tube includes an open end adjacent to said extrusion die, said open end being in the general shape of said extrusion die and said cutting surface of said cutter member.

6. The cutter assembly according to claim 4, wherein said end of said filling tube includes an open end adjacent to said extrusion die, said open end being in the general shape of said extrusion die and said cuffing surface of said cutter member.

7. A cutter assembly for an extruder, comprising:
an elongated extrusion member having an opened feed end, said opened feed end being attachable in fluid communication with a first manifold of the extruder for supplying a mash to said elongated extrusion member;
an extrusion die formed in said elongated extrusion member, said extrusion die being shaped to a general shape of a natural food piece; and
a cutter member having an opened drivable end, an elongated cutter wall, and an opened cutter end with a cutting surface for cutting extrudate to a desired length as the extrudate exits the die, said cutting surface being shaped to the general shape of said extrusion die, and said cutter member being disposed at least partially over and reciprocally slidable on the extrusion member and operably connectable at the drivable end to a drive device of the extruder for reciprocatably sliding the cutting surface of the cutter member over and away from the extrusion die.

8. The cutter assembly according to claim 7, further comprising a filling tube extending through said elongated extrusion member, said filling tube being attachable to a second manifold of the extruder for supplying a filling to said filling tube, wherein said filling tube includes a filling tube extension formed on an end of said filling tube adjacent said opened feed end of said elongated extrusion member, said filling tube extension extending transverse to an axis of said filling tube and being connectable to the second manifold of the extruder.

9. The cutter assembly according to claim 7, wherein said cutter member is tubular and said elongated cutter wall includes an inside diameter generally the same diameter as an outside diameter of said extrusion, member, said cutter member being slidable on said extrusion member to reciprocate said culling surface in cooperation with said extrusion die.

10. The culler assembly according to claim 7, further comprising a filling tube extending through said elongated extrusion member, said filling tube being attachable to a second manifold of the extruder for supplying a filling to said filling tube, wherein said filling tube extends through an axial center of said elongated extrusion member, said filling tube having an end adjacent to said extrusion die, said end being bent toward said extrusion die.

11. The cutter assembly according to claim 7, further comprising a filling tube extending through said elongated extrusion member, said filling tube being attachable to a second manifold of the extruder for supplying a filling to said filling tube, wherein said filling tube includes an open end adjacent to said extrusion die, said open end being in the general shape of said extrusion die and said cutting surface of said cutter member.

12. The cutter assembly according to claim 10, wherein said end of said filling tube includes an open end adjacent to said extrusion die, said open end being in the general shape of said extrusion die and said cutting surface of said cutter member.

13. The cutter assembly according to claim 7, wherein said elongated extrusion member has a nidox coating applied to at least a bottom portion thereof, and said extrusion die is formed in said elongated extrusion member after said nidox coating is applied to thereto.

14. The cutter assembly according to claim 7, further comprising a filling tube extending through said elongated extrusion member, said filling tube being attachable to a second manifold of the extruder for supplying a filling to said filling tube.

15. The cutter assembly according to claim 13, further comprising a filling tube extending through said elongated extrusion member, said filling tube being attachable to a second manifold of the extruder for supplying a filling to said filling tube.

* * * * *